United States Patent

Jones

(10) Patent No.: US 7,679,306 B2
(45) Date of Patent: Mar. 16, 2010

(54) FEEDBACK CONTROL SYSTEM

(75) Inventor: Martin Edward Jones, Monmouthshire (GB)

(73) Assignee: Airbus Operations Limited, Bristol (GB)

( * ) Notice: Subject to any disclaimer, the term of this patent is extended or adjusted under 35 U.S.C. 154(b) by 253 days.

(21) Appl. No.: 11/686,702

(22) Filed: Mar. 15, 2007

(65) Prior Publication Data

US 2007/0216334 A1    Sep. 20, 2007

(30) Foreign Application Priority Data

Mar. 16, 2006   (GB)   ................................. 0605346.6

(51) Int. Cl.
   *G05B 5/01*   (2006.01)
(52) U.S. Cl. ........................ 318/611; 318/615; 318/623; 318/628; 73/147; 73/774
(58) Field of Classification Search ................. 267/156; 73/774, 862.01, 840, 147; 318/611, 623, 318/628, 615, 652; 188/378; 244/183
   See application file for complete search history.

(56) References Cited

U.S. PATENT DOCUMENTS

| 4,139,811 | A | * | 2/1979 | Klinger ....................... 318/615 |
| 4,228,386 | A | * | 10/1980 | Griffith ........................ 318/628 |
| 5,086,564 | A | | 2/1992 | Schalz |
| 5,390,948 | A | | 2/1995 | Kuriki et al. |
| 5,566,378 | A | * | 10/1996 | Nagasawa et al. ........ 360/77.16 |
| 5,620,068 | A | * | 4/1997 | Garnjost et al. ............. 188/378 |
| 5,714,860 | A | * | 2/1998 | Makinouchi ................ 318/561 |
| 5,721,566 | A | * | 2/1998 | Rosenberg et al. .......... 345/161 |
| 6,002,184 | A | * | 12/1999 | Delson et al. ................. 310/14 |
| 6,026,338 | A | * | 2/2000 | Borschert et al. ............. 701/37 |
| 6,029,959 | A | * | 2/2000 | Gran et al. ................... 267/136 |
| 6,095,295 | A | * | 8/2000 | Park et al. ................ 188/267.2 |
| 6,137,254 | A | * | 10/2000 | Hughes ....................... 318/611 |
| 6,158,695 | A | * | 12/2000 | Najmabadi et al. .......... 244/183 |
| 6,271,828 | B1 | * | 8/2001 | Rosenberg et al. .......... 345/156 |
| 6,296,093 | B1 | * | 10/2001 | Norris et al. ................ 188/378 |
| 6,465,933 | B1 | * | 10/2002 | North, Jr. .................... 310/317 |

(Continued)

FOREIGN PATENT DOCUMENTS

EP    1574923 A2    9/2005

(Continued)

*Primary Examiner*—Bentsu Ro
*Assistant Examiner*—Antony M Paul
(74) *Attorney, Agent, or Firm*—Lowe Hauptman Ham & Berner LLP

(57) ABSTRACT

A closed loop control system for controlling an actuator operating on a moveable member, includes a control device controlling operation of the actuator, a sensor responsive to a condition such as loading of the moveable member as it is moved by the actuator and adapted to generate a corresponding feedback control signal $S_L$, and a damping device having a damping effect on the response of the actuator to the feedback control signal, the damping effect being varied in accordance with the movement of the moveable member so as to vary the response of the actuator. The damping effect is increased in the region of stationary states to render the system more stable, and reduced therebetween to make the system more responsive at increased speeds, and thereby more conformal to a required performance profile. The position or velocity of the moveable member can be used to control the damping effect, or a timer can be used to control the damping effect.

7 Claims, 2 Drawing Sheets

U.S. PATENT DOCUMENTS

| | | | |
|---|---|---|---|
| 6,566,837 B1 * | 5/2003 | Zhang et al. | 318/610 |
| 6,598,885 B2 * | 7/2003 | Delorenzis et al. | 280/5.507 |
| 6,679,504 B2 * | 1/2004 | Delorenzis et al. | 280/5.507 |
| 7,281,431 B2 * | 10/2007 | Englund et al. | 73/774 |
| 7,357,357 B2 * | 4/2008 | Giazotto | 244/183 |
| 7,373,836 B2 * | 5/2008 | Bohr et al. | 73/774 |
| 7,469,885 B2 * | 12/2008 | Englund et al. | 267/156 |
| 2002/0170399 A1 * | 11/2002 | Gass et al. | 83/62.1 |
| 2005/0007059 A1 * | 1/2005 | Chew et al. | 318/623 |

FOREIGN PATENT DOCUMENTS

| | | |
|---|---|---|
| GB | 1197618 | 7/1970 |
| JP | 9-39534 A | 2/1997 |
| JP | 10-103403 A | 4/1998 |
| JP | 2000-211335 A | 8/2000 |
| WO | 2004/089744 A1 | 10/2004 |

* cited by examiner

FEEDBACK CONTROL SYSTEM

TECHNICAL FIELD

This invention relates to a feedback control system for controlling an actuator operating on a moveable member, and particularly relates to loading of a moveable member to simulate operational loads for testing purposes.

BACKGROUND ART

Within a feedback control system, a calculation can be made to determine the velocity of a moveable member controlled by an actuator, such as a hydraulic or electric actuator. From this velocity value, a proportional opposing force can be calculated and fed back into the control loop to effectively damp operation of the actuator. As the system velocity increases, the force command is reduced, and thereby reduces damping of the system's response.

The disadvantage of this type of feedback control within a reactive closed loop control system is that it can lead to 'force errors' or 'force lag'. This is a situation where the desired force cannot be achieved as the damping calculation is reducing the commanded force to maintain a stable system. Due to this, damping functions within control systems are currently only suitable for slow response or statically loaded systems. Damping functions are unsuitable for high response, dynamic systems as the 'force errors' or 'force lag' become very high.

As an example, aircraft components such as landing gear doors are tested during development by loading a door in a test rig so as to simulate the loads experienced when the door is opened and closed in use. Typically, a hydraulic loading actuator is connected between the test rig and the door so as to apply loading to the door, and a feedback control loop varies the loading applied depending upon the position of the door. The feedback control loop comprises a load sensor that senses the load applied by the actuator and a servo valve, which controls the supply of hydraulic fluid to the actuator. If the landing gear door moves very rapidly in operation, the feedback control loop has to be highly responsive in order to maintain the required loading as the door moves. However, highly responsive systems can become unstable at low speed or during static conditions. An object of the invention is to provide an improved loading simulation test system.

SUMMARY OF THE INVENTION

According to one aspect, the invention comprises test apparatus for testing a moveable member subject to a load in use, the apparatus comprising: a load actuator to apply a load to the moveable member, a load controller that controls operation of the load actuator so as to apply a predetermined load to the moveable member as it is moved, and a damping controller that is responsive to a condition of the moveable member as it is moved and that generates a corresponding damping signal to control the damping effect of the load actuator on movement of the moveable member.

According to a second aspect, the invention comprises a loading simulation test system for controlling the load applied by a load actuator to a moveable member during movement of the latter comprising a load controller controlling operation of the load actuator including a load sensor responsive to the load applied by the load actuator to the moveable member and adapted to generate a corresponding load feedback control signal, a damping controller including a position or velocity sensor to sense the position or velocity of the moveable member and to generate a corresponding position or velocity signal that varies the damping effect of the load actuator in accordance with the position or velocity of the moveable member.

The variation of the damping effect in accordance with movement of the moveable member allows the responsiveness of the actuator to be varied to suit different speeds at which the moveable member moves. In particular, if the moveable member moves between stationary states at a high speed, the damping effect can be increased in the region of the stationary states to render the system more stable, and reduced therebetween to make the system more responsive at increased speeds and thereby more conformal to the required performance profile. The position or velocity of the moveable member can be used to control the damping effect, or a timer can be used to control the damping effect.

Other aspects of the invention consist of a method of testing a moveable member, and a method of simulating loading of a movable member.

The invention will now be described by way of example with reference to the accompanying drawings in which:

BEST MODE FOR CARRYING OUT THE INVENTION

Figure 1:
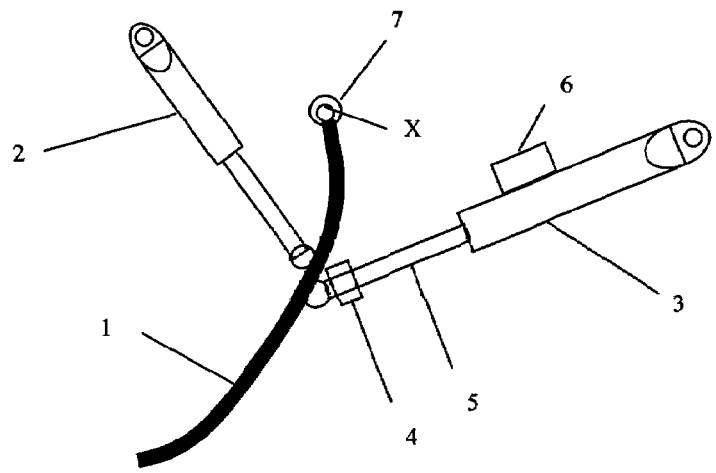
FIG. 1 is a schematic diagram of a test system for an aircraft landing gear door.

FIG. 1 shows the section of a landing gear door 1 of an aircraft with a hinge axis x for connection to an aircraft body so as to close a storage bay for aircraft landing gear within the aircraft body. A hydraulic actuator 2 is provided for connection between the aircraft body and the door, and operates to open and close the door during normal operation of the aircraft when landing and taking off. When the door is open, during takeoff and landing, it is subject to dynamic forces caused by the airflow and G forces, and the door assembly has to be designed to withstand these forces on a repetitive basis over the lifetime of the assembly. Therefore, during development, such systems have to be tested to ensure they meet performance and endurance requirements. In order to test a door assembly, it is normal to provide a test rig in which the door and door operating actuator are mounted as they would be in use. In addition, test equipment including a load actuator 3 is provided which is connected to the door and which operates in conjunction with movement of the door so as to simulate the loads experience by the door when in use. FIG. 1 illustrates the door 1, the door operating actuator 2, and the load actuator 3 installed in a test rig.

Figure 2:
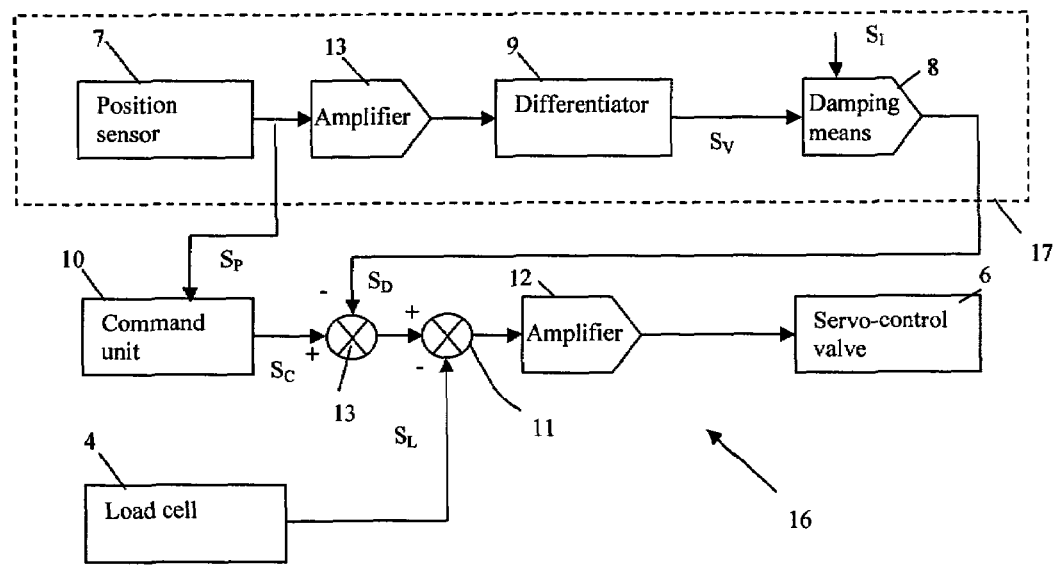
FIG. 2 is a schematic diagram of a feedback control loop controlling the load actuator of FIG. 1 according to the invention.

In order to control operation of the load actuator 3, it is provided with a feedback control loop 16 shown in FIG. 2 which acts as a load controller. The feedback control loop or load controller 16 comprises a command unit 10 which generates a force command signal $S_c$ in accordance with force values stored in a look-up table against positions of the door. A position sensor 7 is provided in the form of a potentiometer associated with the hinged mounting of the door, and this produces a position signal $S_p$ which is fed to the command unit to generate force values from the look-up table. A load cell (load sensor) 4 is attached to the piston rod 5 of the load actuator so as to sense the load applied to the door 1, and generates a load feedback signal $S_L$. The force command signal $S_c$ is summed with a damping signal $S_D$ (described hereinafter) in an adder 13 and the resultant output is summed with the load feedback signal $S_L$ in an adder 11. The output of adder 11 is amplified in an amplifier 12 before being applied to a servo-control valve 6 mounted on the cylinder of the load actuator 3 which controls the flow of hydraulic fluid to the actuator.

Figure 3:
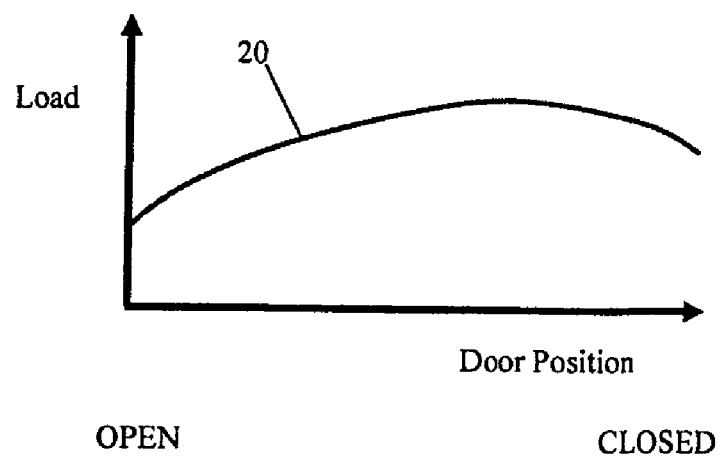
FIG. 3 is a graph of the load v position profile of the door in the test system of FIGS. 1 and 2.

The load actuator 3 is therefore operated under load control and the load is varied in accordance with the door position. A typical load/position control profile 20 of the actuator 3 is shown in FIG. 3.

In a system in which the door 1 is moved rapidly by the door actuator 2, the feedback control loop has to be such that the load actuator 3 is highly responsive to the change of door position in order to maintain the required load/position profile. However, at each of the extremes of the movement of the door, when in the fully closed or fully opened position, a highly responsive actuator can cause problems whilst waiting for the door to open or close. For example, the door when closed may be loaded against door stops which make the door stiff, and a highly responsive load actuator is liable to generate force errors and to be unstable. Therefore, damping means 8 is incorporated in the control feedback loop so as to vary the responsiveness of the load actuator, in particular, to reduce the responsiveness of the load actuator at the end positions. The system is then stable under static conditions, but very responsive once the door is moving.

When testing the door in FIG. 1, various different operating conditions may need to be simulated including door opening conditions when retracting the landing gear, door closing conditions when retracting the landing gear, door opening conditions when extending the landing gear, and door closing conditions when extending the landing gear. Accordingly, a different look-up table in the command unit 10 may be provided for each condition.

In order to vary the damping of the system, the damping means 8 generates the damping signal $S_D$ which is summed with the force command signal $S_C$ in adder 13, the output then being summed with the load feedback signal $S_L$ in adder 11. The damping signal $S_D$ has the effect of reducing the force command signal $S_C$ and thus the response of the servo valve 6. This effect is controlled by varying the damping signal $S_D$ through the damping means 8. The damping means 8 has an input that receives a velocity feedback signal $S_V$ generated by differentiating the position feedback signal $S_P$ in a differentiator 9 after it has been amplified by an amplifier 13. A velocity sensor 20 is defined as a combination of the position sensor 7 and the differentiator 9 (and amplifier 13). The damping means 8 also has a second input damping control signal $S_I$, which serves to modify the damping effect of the velocity feedback signal $S_V$ dependent upon the position of the door. Thus $S_I$ may comprise the position feedback signal $S_P$. At predetermined door positions, the damping means 8 responds to the control signal $S_I$ by changing the damping signal $S_D$. These door positions are typically near the door open and door closed positions, and between these positions the damping means 8 operates to reduce the damping signal $S_D$, and either side of these door positions the damping means operates to pass a damping signal $S_D$ in accordance with the velocity feedback signal $S_V$. The position sensor 7, amplifier 13, differentiator 9 and damping means 8 thus act as a damping controller 17 which varies the size of the damping signal $S_D$ depending on the position of the door 1.

Figure 4:
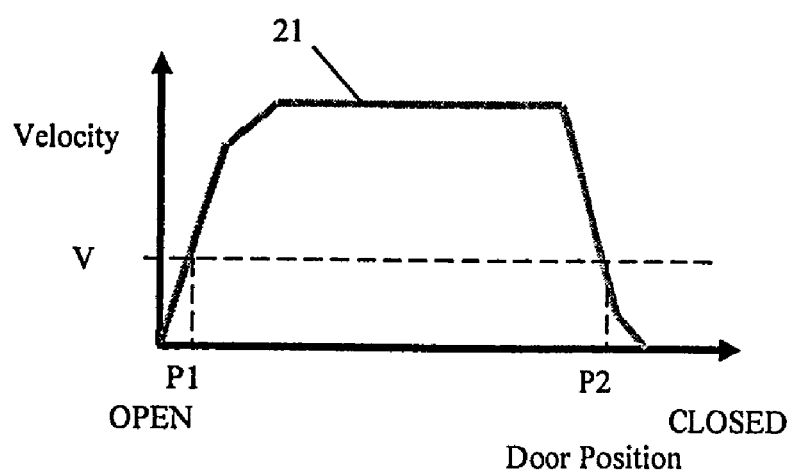
FIG. 4 is a graph of the velocity v position profile of the door of the test system of FIGS. 1 and 2.

FIG. 4 illustrates the variation of the velocity 21 of the door with position, and superimposed upon it is a horizontal line at a threshold velocity V which intercepts the velocity graph at threshold positions P1 and P2 near the door open and door closed positions, respectively, as detected by the position sensor 7. The damping signal $S_D$ is switched to zero between the positions P1 and P2 or just reduced compared with the signal $S_D$ either side of these positions P1 or P2. In an alternative embodiment of the invention, the damping means 8 might be controlled so as to reduce the damping signal between predetermined velocities. Alternatively, the timing of operation of the door may be used to determine threshold times at which the damping signal is to be reduced. In all cases, the damping signal is controlled in accordance with movement of the door, as measured or as deduced.

It will be appreciated that the test system of FIGS. 1 to 4 can be used to perform load simulation tests on any moveable member that experiences loads in operation, especially when the member experiences great variations in speed of movement. For example, in aerospace applications, this type of control could be used for tests such as flight control avionic systems, component tests, structural tests, systems tests, iron bird tests, flight control tests, fatigue/endurance tests, gear shock absorber tests, flight simulators and fly by wire force feedback systems.

For automotive applications damping scheduling can be used in simulation tests such as road conditions, structural testing, endurance testing, power steering feedback, electric braking, active suspension systems, fixed body testing of automotive chassis components (both vehicle suspension and engine isolation), variable rate suspension bush testing, hydromount engine mount testing and vertical suspension movement involving bump stop testing.

The invention claimed is:

1. Test apparatus for testing a moveable member subject to a load in use, the apparatus comprising:
a load actuator to apply a load to the moveable member,
a load controller that controls operation of the load actuator so as to apply a predetermined load to the moveable member as it is moved, and
a damping controller that is responsive to a condition of the moveable member as it is moved and that generates a corresponding damping signal to control the damping effect of the load actuator on movement of the moveable member,
wherein
the load controller includes a load sensor that senses the load applied by the load actuator to the moveable member and generates a load feedback signal, a load command generator that generates a load command signal dependent upon the position of the moveable member, and a comparator that combines the load feedback signal and load command signal to generate a load control signal that determines the load applied by the load actuator.

2. Apparatus as claimed in claim 1 wherein the damping controller includes a position or velocity sensor adapted to sense the position or velocity of the moveable member and to generate a corresponding position or velocity signal that controls generation of the damping signal.

3. Apparatus as claimed in claim 2 wherein the moveable member is moved from a start position, and the position or velocity sensor detects a first position or velocity level after the start position and controls generation of the damping signal at said first position or velocity level to reduce the damping effect of the load actuator.

4. Apparatus as claimed in claim 2 wherein the moveable member is moved to an end position, and the position or velocity sensor detects a second position or velocity level before the end position and controls generation of the damping signal at said second position or velocity level to increase the damping effect of the load actuator.

5. Apparatus as claimed in claim 1 wherein the damping controller comprises a damping signal generator that generates a damping signal in accordance with movement of the moveable member and which is combined with the load command signal in the comparator.

6. Apparatus as claimed in claim 1 wherein the damping controller includes a position sensor that generates a position signal in accordance with the position of the moveable member and that serves to synchronise generation of the damping signal with movement of the moveable member.

7. Apparatus as claimed in claim 1 including a primary actuator that serves to move the moveable member.

\* \* \* \* \*